United States Patent [19]

Boyesen

[11] Patent Number: 5,176,170
[45] Date of Patent: Jan. 5, 1993

[54] MULTIPLE STAGE REED VALVES FOR USE IN INTERNAL COMBUSTION ENGINES

[75] Inventor: Eyvind Boyesen, Kempton, Pa.

[73] Assignee: Performance Industries, Inc., Kempton, Pa.

[21] Appl. No.: 740,447

[22] Filed: Aug. 5, 1991

[51] Int. Cl.⁵ .............................................. F16K 15/16
[52] U.S. Cl. .............................. 137/512.1; 123/65 V; 123/73 V; 137/855
[58] Field of Search .......................... 137/512.1, 855; 123/65 V, 73 V

[56] References Cited

U.S. PATENT DOCUMENTS

| | | |
|---|---|---|
| 157,791 | 12/1874 | Cameron . |
| 919,036 | 4/1909 | Langer . |
| 939,549 | 11/1909 | Reineking . |
| 2,382,716 | 8/1945 | Herzmark . |
| 2,689,552 | 9/1954 | Kiekhaefer . |
| 3,690,304 | 9/1972 | Schneider et al. . |
| 3,859,968 | 1/1975 | Stinebaugh . |
| 3,905,340 | 9/1975 | Boyesen . |
| 3,905,341 | 9/1975 | Boyesen . |
| 4,000,723 | 1/1977 | Boyesen . |
| 4,051,820 | 10/1977 | Boyesen . |
| 4,191,138 | 3/1980 | Jaulmes . |
| 4,250,844 | 2/1981 | Tews . |
| 4,324,097 | 4/1982 | Schmitt et al. . |
| 4,331,118 | 5/1982 | Cullinan . |
| 4,408,579 | 10/1983 | Kusche . |
| 4,643,139 | 2/1987 | Hargreaves . |
| 4,696,263 | 9/1987 | Boyesen . |
| 4,712,520 | 12/1987 | Pasquin . |
| 4,879,976 | 11/1989 | Boyesen .......................... 137/855 X |
| 5,036,806 | 8/1991 | Rarick . |

FOREIGN PATENT DOCUMENTS 55-5476  1/1980  Japan .

Primary Examiner—Robert G. Nilson
Attorney, Agent, or Firm—Ferrill, Logan, Johns & Blasko

[57] ABSTRACT

The present invention provides improved multiple stage reed valve construction for internal combustion engines. The reed valves comprise first stage reed valves with enlarged ports, enlarged second stage reed valves corresponding with the ports, and one or more webs positioned in the ports to help support the second stage reed member when it is in a closed position. The reed valves of the present invention provide significant improvements in engine operation and tremendous increase in reed valve operational life.

27 Claims, 5 Drawing Sheets

MULTIPLE STAGE REED VALVES FOR USE IN INTERNAL COMBUSTION ENGINES

BACKGROUND OF THE INVENTION

1. Field of the Invention

The present invention relates to valves for controlling fluid flow in an internal combustion engine. More particularly, the present invention relates to reed valves for controlling intake and/or transfer fluid flow in such engines.

2. Background of the Prior Art

Reed valves are presently widely employed in internal combustion engines to control air or air/fuel intake. In two-stroke cycle engines, such as disclosed in U.S. Pat. Nos. 3,905,340, 3,905,341, and 4,051,820, such reed valves play an important role in supporting the improved operation of the engine and the proper transfer of air and fuel from crankcase to combustion chamber. More recently, such reed valves also have been employed in four-stroke cycle engines to control air intake and improve engine performance.

In U.S. Pat. No. 3,905,340 it is disclosed that significant improvements in reed valve life and performance may be achieved by substituting a multiple stage reed valve design in place of a conventional single stage reed. In the design disclosed in that patent, a relatively stiff primary reed is utilized having ports therein. A secondary reed member is then oriented over the ports in the primary reed, with a secondary reed petal sealing each of the primary reed ports. The secondary reed member provides fluid flow through the ports in the primary reed member. In order to allow such flow, the secondary reed members are far more flexible than the primary reed so that the secondary reed member opens farther than the primary reed during the pressure changes each engine cycle. The invention of the '340 patent improves engine performance in virtually all applications and, due to the reduced stresses inherent with this design, reed valve life is dramatically increased.

Although the multi-stage reed disclosed in U.S. Pat. No. 3,905,340 functions very well, it has been found that further improvements may be possible to that design. One problem that has been encountered is that many intake passages have uneven flow distribution through them which results in greater stress placed on certain petals of the secondary reed. As a result of the increased stresses placed on only some of the reed petals, the over-stressed petals will undergo material fatigue and break far more rapidly than less stressed reed petals. Applicant's U.S. Pat. No. 4,696,263 attempts to address this problem in part by providing a protective coating of synthetic rubber on the reed valves to prolong their life.

Further, uneven flow distribution through the air intake, conventional or multi-staged reeds do not provide optimum air intake distribution into the engine. One solution to this problem is addressed in applicant's U.S. Pat. No. 4,879,976 for an aeroform reed valve cage which modifies the intake passage upstream from the reed valves so to provide more even air flow through the reed valves. Another approach to solving this problem is disclosed in U.S. patent application Ser. No. 465,472, now allowed, which calls for joining together the reed petals of the secondary reed member to improve intake flow and reduce reed petal fatigue.

Notwihhstanding these advances, additional improvements in reed valve performance and life are shown to be possible. First, even though it is known that thicker reed material has a significantly better operating life, the thickness of the reed valves is necessarily limited by the need to assure proper reed flexibility to allow the valves to have proper frequency response.

Another major problem that still exists is that all the above multiple stage reeds are dependent upon use of relatively narrow primary reed ports and corresponding petals. Although wider ports may improve fluid intake, wider petals have been avoided because they are subject to greater strain and fatigue. It is known that wider petals are stressed or destroyed when they flex into and/or "blow-through" wider ports under heavy pressure modes during certain stages of the operation of an engine.

The impact of this problem is also evident in reed cage designs which have traditionally included narrow segmented openings to help support each of the individual reed petals. Despite efforts to create aerodynamic supports, these supports necessarily add to turbulence and disruption of proper fluid intake. Although the problem of turbulence from these supports is addressed by advancements in the aerodynamics of reed cage design, such as the reed cages disclosed in U.S. Pat. No. 4,879,976, the continued existence of segments between the numerous narrow ports in primary reed members tend to limit the advantages of such technology.

Accordingly, it is a primary object of the present invention to provide an improved reed valve which provides all the benefits of prior multi-stage reed valves while having improved flow characteristics, improved performance, and further increased operating life.

It is a further object of the present invention to provide a reed valve with the above advantages which employs thicker reed valve material and wider reed valve ports and petals for improved life and flow characteristics.

It is another object of the present invention to provide a reed valve with the above advantages which better complements advancements in aerodynamic reed cage technology.

It is an additional object of the present invention to provide a reed valve with the above advantages which is straightforward in design and adds no weight, complexity, or expense to the engine or the air intake system.

These and other objects of the present invention will become evident from review of the following specification.

SUMMARY OF THE INVENTION

The present invention provides an improved multi-stage reed valve for use in all form of internal combustion engines. In its most basic form, the reed valves of the present invention comprise a first stage valve member with a substantially enlarged port and an enlarged second stage reed member which seats over the enlarged port. In order to prevent the second stage reed member from being drawn through the enlarged port, one or more webs are provided within the port to help support the second stage reed member.

When compared with conventional single and multi-stage reed valves, the present invention provides considerably improved flow and increased engine output throughout the power band. Moreover, the construction of the reed valves of the present invention permit the use of substantially thicker reed material. The improved reed material and smoother flow combine to deliver reed valves with dramatically increased operational life.

The present invention is believed to provide improved operation in all forms of internal combustion engines, and particularly in two-stroke cycle engines where they assist in regulating both fluid intake and compressed fluid transfer. Further, the present invention provides even greater improvements when combined with recent innovations in aeroform reed cage construction.

DESCRIPTION OF THE DRAWINGS

The operation of the present invention should become apparent from the following description when considered in conjunction with the accompanying drawings, in which.

DETAILED DESCRIPTION OF THE INVENTION

The present invention provides an improved reed valve for controlling intake and/or transfer fluid flow in all forms of internal combustion engines.

Figure 1:
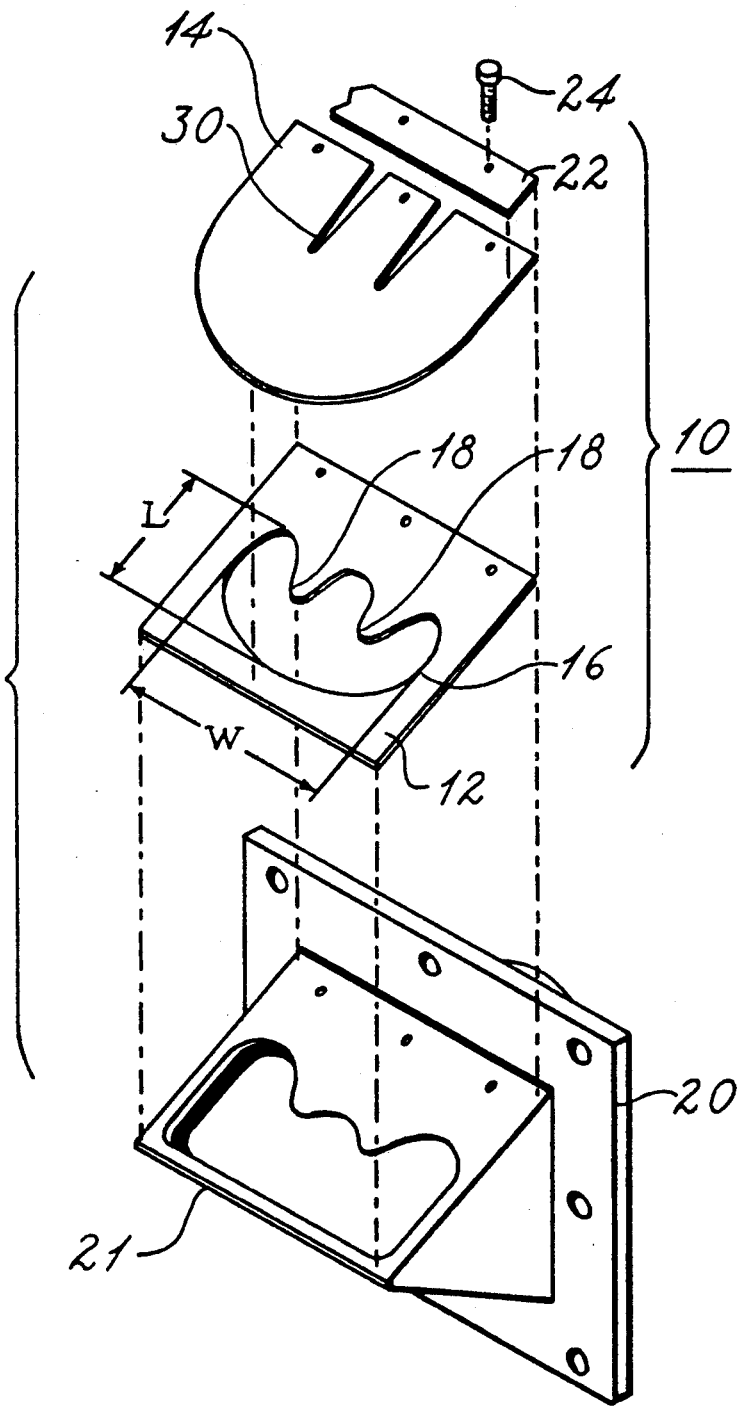
FIG. 1 is an exploded three-quarter isometric view of one embodiment of the reed valve of the present invention shown with an aeroform reed cage.

As is shown in FIG. 1, the reed valve 10 of the present invention comprises a first stage reed member 12 and a second stage reed member 14. The first stage reed member includes a port 16 and at least one web 18, 18 which extends into the port 16. Unlike ports in previous first stage reed members, the port 16 may be constructed with a width W, perpendicular to the direction of fluid flow, which is greater than its length L. The second stage reed member 14, which comprises essentially a single wide reed petal, is proportioned to fit over and completely cover the port 16 when the reed valve is completely closed. As is shown, the reed valves 10 of the present invention may be easily mounted to all forms of reed cages 20 by any known means, such as employing a conventional mounting strip 22 and mounting screws 24. Mounting holes 23a, 23b may be provided on a base end 25a, 25b of each of the reed members 12, 14, respectively, for attachment of the mounting screws 24.

In existing multi-stage reed valves, the width of the ports in the first stage reed member and the reed petals of the second stage reed member were necessarily limited to prevent the second stage reed members from being sucked through the port under a heavy operating mode of the engine. This phenomenon, commonly referred to as "blow-through," destroys the reed valve and, in the case of metal reeds, may cause serious damage to the engine. The wide port construction of the present invention is made possible through the use of one or more webs 18 which support the second stage reed member 14 when the valve 10 is in a closed position.

In the preferred embodiments illustrated herein, the web 18 comprises an extension of the first stage reed member 12 which protrudes part way into the port 16 and bisects the width of the first stage reed member 12. It should be appreciated that, depending on a particular engine's design and desired results, the web may take other forms and different positions within the port without departing from the present invention.

One considerable benefit of the present invention is that it can be employed with exceptional results with improved aeroform reed cage designs 20. The reed cage 20 shown in FIG. 1 is one reed cage embodiment which is disclosed in U.S. Pat. No. 4,879,976 issued to Boyesen on Nov. 14, 1989. One of the modifications of that reed cage 20 is to eliminate intermediate supports between port openings commonly found with most conventional reed valve cage construction. With pre-existing technology, these intermediate supports serve to buttress the first stage reed member between its ports to reduce fatigue of the reed members. Through the use of improved flow characteristics and more aerodynamic truncated supports, the aeroform reed cage essentially eliminates the need for the prior supports. Although the aeroform reed cage vastly improves flow, it is now thought that the continued presence of segmented port in the first stage reed member tends to continue to create unnecessary flow turbulence at low and medium engine speeds. It is believed that by employing reed members of the present invention with such an improved reed cage, localized turbulence in the flow path may be reduced even further.

Figure 2:
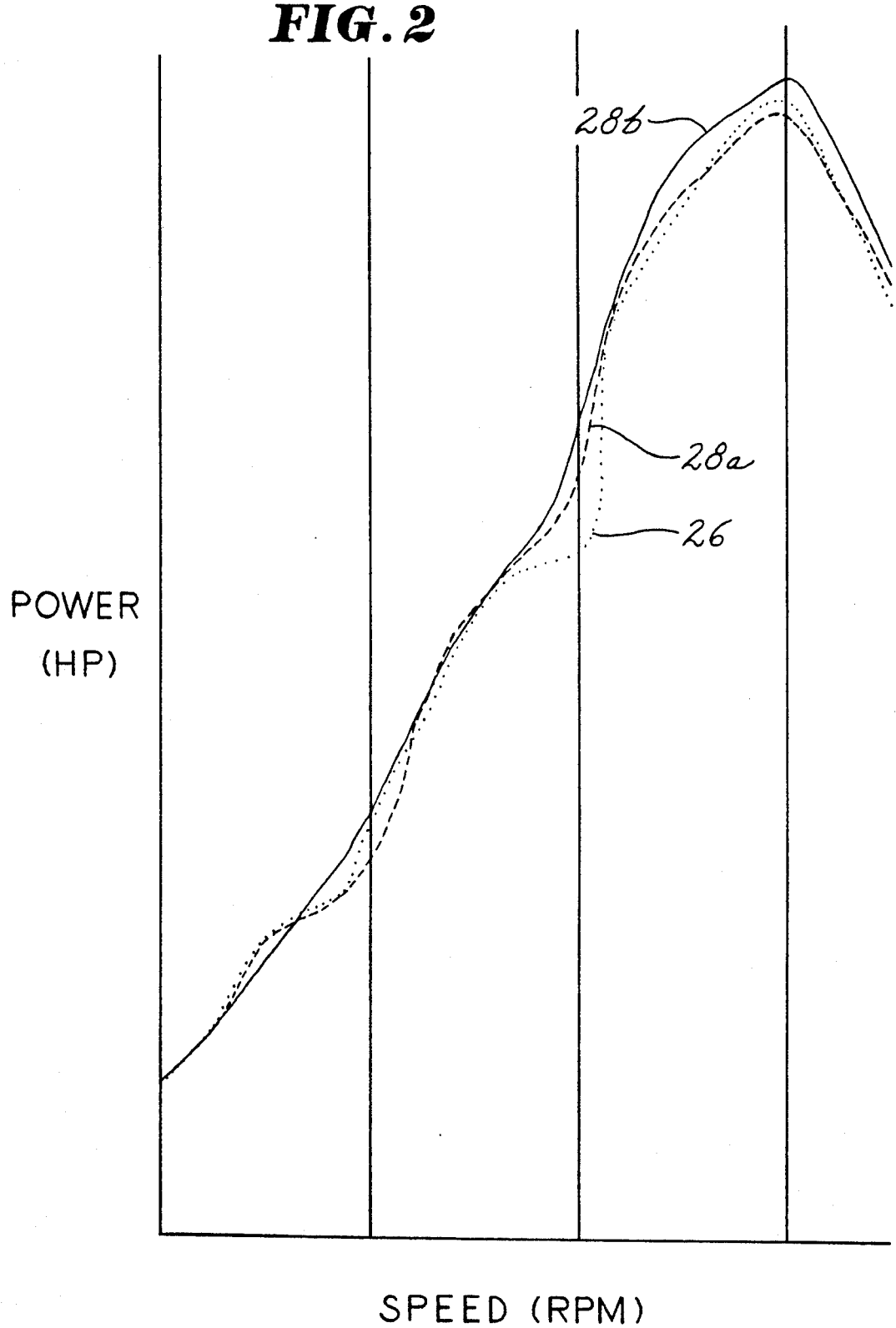
FIG. 2 is a graph showing relative power curves of a two-stroke cycle engine employing reed valves of the present invention and conventional multi-stage reed valves.

An example of the improved output of the present invention is shown in the graph of FIG. 2. This graph represents a power curve 26 of a two-stroke cycle engine using a conventional multi-stage reed valve with the engine "jetted" to maximize the performance of conventional reed valves, a power curve 28a for the same engine (unadjusted) using reed valves of the present invention, and a power curve 28b for the same engine using reed valves of the present invention with an adjustment of the "jetting" of the engine to maximize the benefit of the improved reed valves. As can be seen, the reed valves of the present invention provide an improvement in output across the power band. Moreover, the reed valves of the present invention provide a significant improvement in output in mid-range power—an area where multi-stage reeds have traditionally needed improvement.

An even more important improvement of the present invention is that reed valve life is drastically prolonged by adopting the present invention. In prior reed valves, in order to get proper flex and frequency response from the reeds, the thickness of the reed material had to be limited to maintain proper reed tension. In a multi-stage reed valve, such as the ones shown in U.S. Pat. No. 3,905,340, each first stage reed valve member generally includes multiple openings, each separated by a strip or "bridge" of reed material. In order to establish proper reed tension, the reed valve material must be proportioned to overcome the resistance of each of these bridges. Accordingly, reed valve design entails a balancing of the flexibility necessary to have the reeds function properly and the thickness required for adequate reed valve life.

It has been found that reed valve material of greater thicknesses have substantially greater operational life. This is particularly true of the material comprising an outermost edge 29 of the reed—that portion which continually strikes an apex 21 of the reed cage 20. With the wide port 16 and open construction of the first stage reed member 12 of the present invention, the valve member 12 necessarily has far greater flexibility for a given material thickness (i.e. there are no intermediate bridges on the first stage reed member which must be flexed in reed operation). As a result, the valve member 12 can be constructed from far thicker and more durable material, which greatly increases it operational life, and still have suitable flexibility for proper operation and power.

The second stage reed members 14 also have improved life with the present invention. One of the major factors causing second stage reed member fatigue is the substantial stresses placed upon the narrow reed petals during each engine cycle. As is noted in U.S. patent application Ser. No. 465,472, now U.S. Pat. No. 5,036,806, some of the detrimental stresses on each of the individual reed petals can be reduced by joining adjacent petals together so that they move in unison. The present invention provides even greater life improvement by providing a much larger "petal" on the second stage reed member. Even if somewhat thinner material is employed in order to have adequate flexibility, the dispersion of the stresses along a much larger petal surface more than compensates for this. More importantly, it has been found that the greater amount of flow through the large port 16 creates greater operating pressure, which permits use of even thicker material in the second stage reed member 14 than has been possible in conventional multi-stage reeds. As a result of both these factors, the second stage reed members 14 of the present invention have a significantly longer life span than conventional second stage reed members and are far less likely to undergo premature de-lamination.

The flexibility of the second stage reed ember 14 of the present invention can be further improved by employing one or more slots or gaps 30 along the reed member 14. With no loss of efficiency, this permits use of thicker and more durable material. Flexibility is increased by orienting the gaps 30 along the base of the reed valve 10 as illustrated in FIG. 1. In using gaps 30 it is important that they are completely closed and sealed during periods of no fluid flow into the engine. Preferably this is accomplished by having the gaps 30 align with and thoroughly overlap the webs 18 or some portion of the reed valve cage 20 in a closed position.

The following serve as examples of the greater thicknesses possible with the present invention. A conventional multi-stage reed valve for a 125 cc two-stroke cycle engine typically utilizes a fiber/epoxy laminate first stage reed member with a 0.020" thickness; and a similarly constructed second stage reed valve with a 0.015" thickness. By contrast, a comparably constructed reed valve 10 of the present invention can have a first stage reed member 12 with a thickness of 0.023 to 0.025" and a second stage reed member 14 with a thickness of 0.016 to 0.017". This provides a significant increase in thickness of 15 to 25% for the first stage reed member and 6 to 13% for the second stage reed member.

Similarly, a conventional multi-stage reed valve for a 250 cc two-stroke cycle engine typically utilizes a fiber/epoxy laminate first stage reed member with a 0.024" thickness; and a similarly constructed second stage reed valve with a 0.016" thickness. By contrast, a comparably constructed reed valve 10 of the present invention can have a first stage reed member 12 with a thickness of 0.028" and a second stage reed member 14 with a thickness of 0.017 to 0.018". Again, on the average, first stage reed member material may be increased about 17% in thickness and second stage reed material may be increased up to about 17%.

The combination of improved flow characteristics and thicker reed material provide exceptional improvements in reed operational life. By way of comparison, a test was conducted on a 750 cc two-stroke cycle 2-cylinder boat engine which had a history of unusual reed life problems. A conventional multi-stage reed valve was installed on the engine and it was run at full throttle for 45 minutes until reed valve fracturing started to occur. With all other factors remaining unchanged, a set of reed valves of the present invention were installed on the same engine and the boat was run at full throttle. After 105 hours of testing over approximately 10 days, the engine in the boat finally seized—the reed valves remaining fully operational and without the slightest signs of fracturing. Similar results are expected in all forms of the present invention.

Figure 3:
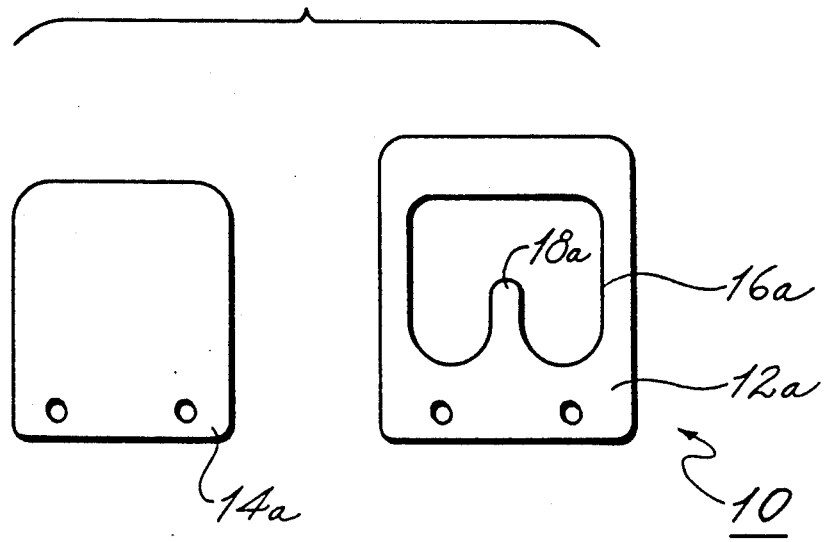
FIG. 3 is a plan view of another embodiment of the first stage and second stage reed members of the present invention.

Other embodiments of the reed valves of the present invention are illustrated in FIGS. 3 through 8. The reed valves 10 in FIG. 3 is a construction suitable for use in a two cylinder 750 cc two-stroke cycle engine (with two such sets being mounted in each engine). In this instance, only a single web 18a is employed in port 16a of first stage reed valve member 12a. A second stage reed member 14a is provided which is proportioned to closely match the contours of port 16a. It should be understood that the particular shape of the port 16, web 18 and second stage valve member 14 are all dependent upon the particular design and flow parameters of each engine and the particular performance characteristics sought.

Figure 4:
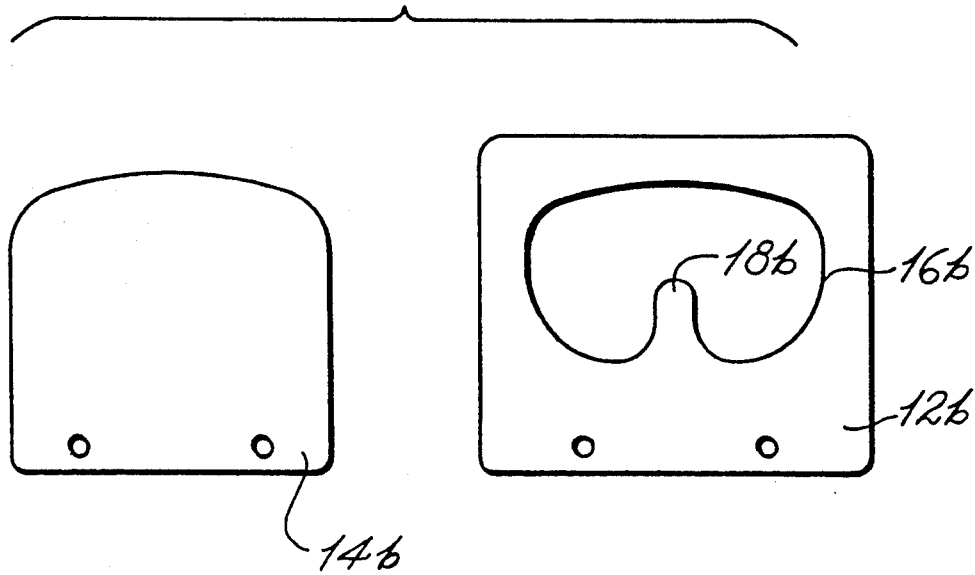
FIG. 4 is a plan view of a further embodiment of the first stage and second stage reed members of the present invention.
Figure 5:
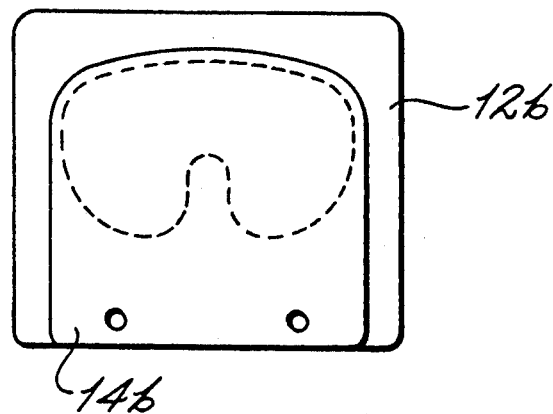
FIG. 5 is a plan view of the embodiment of the present invention shown in FIG. 4 with the first stage and second stage reed members shown mounted in relation to one another.

Another embodiment of the present invention is shown in FIGS. 4 and 5. This construction is suitable for use in a 125 cc two-stroke cycle engine, such as a HONDA MOTOR COMPANY Model CR-125 engine. Again, a single web 18b is employed within port 16b of first stage reed member 12b. A second stage reed member 14b with a contour which closely matches that of port 16b is provided. The relative closed operational position of the two reed members 12b, 14b are shown in FIG. 5. As was noted above, the port 16b, web 18d, and second stage reed member 14b differ in shape from that of the reed valve shown in FIG. 3 to accommodate different flow demands of the two different engines.

Figure 6:
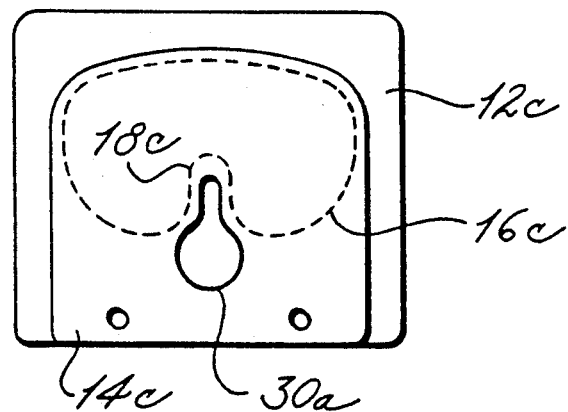
FIG. 6 is another embodiment of the present invention comprising a first stage reed member having a slot therein and second stage reed member.

FIG. 6 shows yet another reed valve construction of the present invention. A first stage reed member 12c is provided with a port 16c. In this embodiment, a second stage reed member 14c is provided with a gap or slot 30a which extends over web 18c. Like the first stage reed member shown in FIG. 1, this construction provides improved flexibility.

Figure 7:
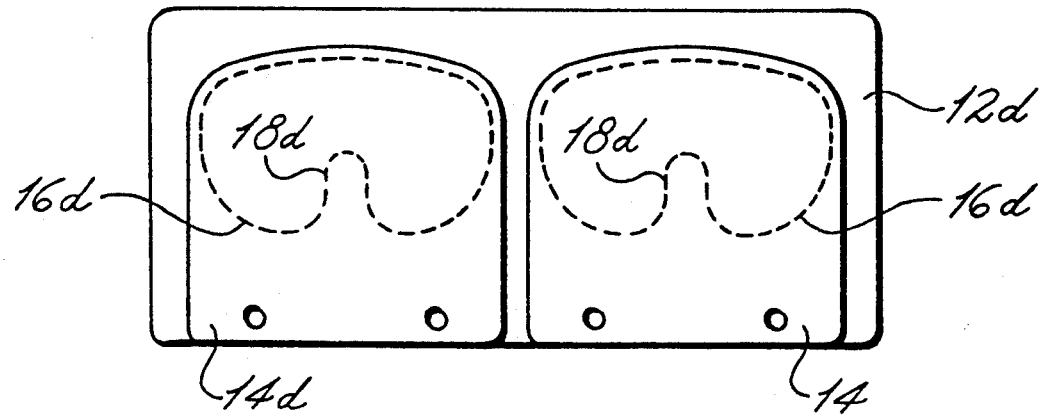
FIG. 7 is yet another embodiment of the present invention comprising a dual first stage reed member and two corresponding second stage reed members.

FIG. 7 shows a dual first stage reed member 12d having side-by-side ports 16d, 16d, each port having a web 18d, 18d. Two second stage reed members 14d, 14d are provided corresponding to each of the ports 16d, 16d. This construction is particularly beneficial for use in larger engines with wider intakes.

Figure 8:
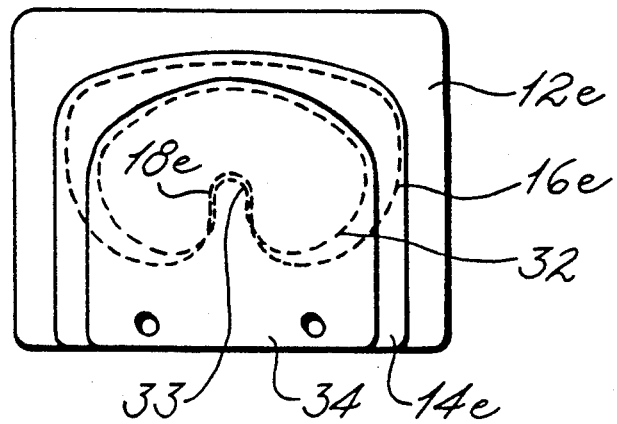
FIG. 8 is still another embodiment of the present invention comprising a first stage reed member, second stage reed member, and third stage reed member.

The construction shown in FIG. 8 demonstrates that the present invention may be employed with more than just two levels of reed members. In this instance, a first stage reed member 12e is provided with a port 16e and a web 18e. Completely covering the port 16e is a second stage reed member 14e. The second stage reed member 14e is also provided with a port 32 and a web 33. A third stage reed member 34 is then provided to cover and seal port 32. This construction is believed to be particularly useful to provide better operation in certain engine designs with unusually long first stage reed construction.

Figure 9:
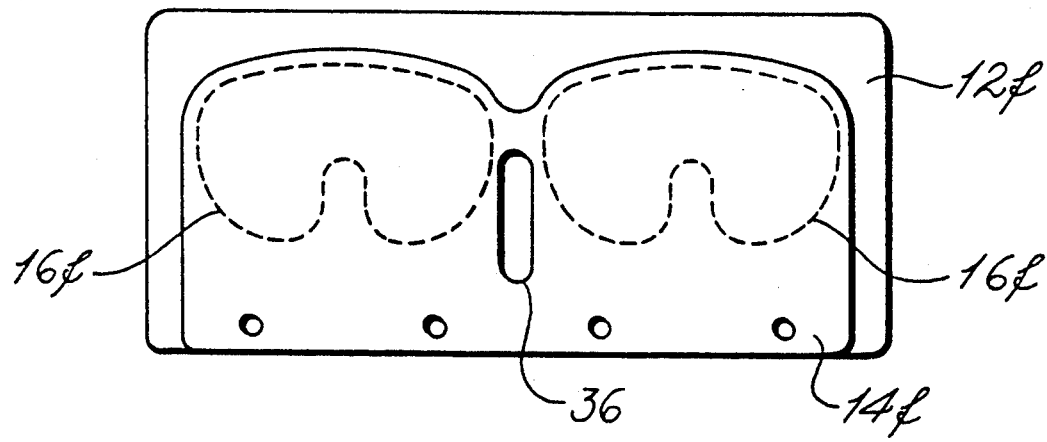
FIG. 9 is another embodiment of the present invention comprising a dual first stage and dual second stage reed member.

FIG. 9 is another embodiment of the present invention which employs a dual first stage reed member 12f having two ports 16f, 16f therein, such as the first stage reed member shown in FIG. 7. In this embodiment, a second stage reed member 14f is provided which is adapted to cover both ports 16f, 16f. One or more slots 36 may be included in the second stage reed member 14f to improve its flexibility.

Figure 10:
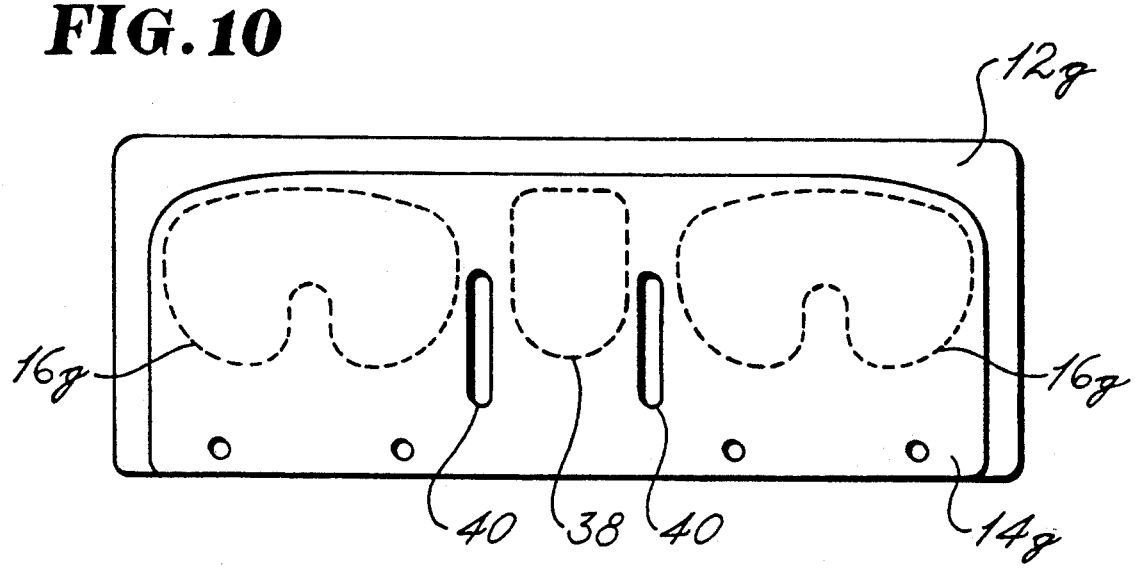
FIG. 10 is another embodiment of the present invention comprising a wide dual first stage reed member and a corresponding wide second stage reed member.

FIG. 10 is another embodiment of the present invention comprising a wide dual first stage reed member 12g. In this case the first stage reed member 12g is designed to have multiple ports 16f, 16f, 38 therein of various dimensions. Employing an arrangement of ports of different dimensions, the flow rate across an engine's intake can be adjusted to provided whatever flow characteristics may be desired. A corresponding wide second stage reed member 14g is provided to cover each of the ports 16f, 16f, 38. Again, slots 40, 40 may be included in the second stage reed member 14g to allow for proper flexibility. This example further demonstrates that the present invention may combine both webbed ports and non-webbed ports to deliver improved engine performance and still assure no reed blow-through.

It should be evident from the above examples that one or more of the particular elements discussed therein may be combined to impart particular performance characteristics. For instance, various gaps, such as slots 30, 30a, 36, 40, can be provided in any or all of the reed members to assure adequate flexibility; the only constraint in this regard is that a portion of the reed cage or a corresponding reed member should block each such slot in a closed position. Similarly, it may be desirable to combine a multiple ported first stage reed member with three or more stages of reeds.

The reed valves 10 of the present invention may be constructed from any known material and in any known manner. Suitable resilient materials may include: metal; composites of fiberglass, KEVLAR ®, or carbon fiber; or composites of two or more of these or similar materials. The presently preferred composition is a glass fiber reinforced with epoxy, melamine, silicone and/or phenolic resins and coated with a layer of rubber or synthetic rubber. Examples of such reed valve construction are disclosed in U.S. Pat. No. 4,696,263 issued to Boyesen Sep. 29, 1987. Further, it should be appreciated that different materials may be employed as is deemed desirable in the different reed valve stage members, or even within a single reed valve stage member.

As has been explained, the present invention functions well in all forms of internal combustion engines where such reed valves may be employed. The reed valves can be used on both carbureted and fuel injected engines and the use of the term "fluid" herein should be read broadly, including both air and combinations of air and fuel. The present invention works particularly well in two-stroke cycle crankcase compression engines where they help to regulate fuel and/or air intake and fluid transfer to a combustion chamber. Further, the present invention is equally applicable to controlling fluid flow in four stroke cycle engines.

Although particular embodiments of the present invention are disclosed herein, it is not intended to limit the invention to such a disclosure and changes and modifications may be incorporated and embodied within the scope of the following claims.

What is claimed is:

1. A reed valve for controlling fluid flow into an internal combustion engine through a fluid intake, which comprises:
   a first stage reed member and a second stage reed member;
   the first stage reed member covering a valve seat oriented in a fluid intake of the engine and being sufficiently flexible to open the valve seat under the influence of decrease in pressure in the engine incident to higher speed engine operation but being sufficiently rigid to open minimally under the influence of decrease in pressure in the engine incident to lower speed engine operation, said first stage reed member having therein a port to permit fluid flow therethrough;
   the second stage reed member being adapted to cover the port in the first stage reed member and to restrict fluid flow through the reed valves during periods of no fluid intake into the engine, the second stage reed member being sufficiently flexible to uncover the port in the first stage reed member under the influence of decrease in pressure in the engine incident to engine operation at all engine speeds; and
   the first stage reed member including a web oriented within its port to assist in supporting the second stage reed member intermediate its ends during periods of no fluid intake into the engine, the web comprising an extension of the first stage reed member which protrudes into the port only in part.

2. The reed valve of claim 1 wherein the port in the first stage reed member comprises a width, perpendicular to the direction of fluid flow, and a length, and wherein the width of the port is greater than its length.

3. The reed valve of claim 2 wherein the second stage reed member includes a gap along its length which overlaps the extension of the first stage reed member when the reed valve is in a closed position.

4. The reed valve of claim 2 wherein the web is oriented mid-way along the width of the port.

5. The reed valve of claim 1 wherein the second stage reed member includes a gap along a part of its length which overlaps the extension of the first stage reed member when the reed valve is in a closed position.

6. The reed valve of claim 1 wherein
the first stage reed member is constructed from a relatively thick, resilient material; and
the port in the first stage reed member is dimensioned to overcome the resiliency of the material of the first stage reed member in order to provide sufficient flexibility of the first stage reed member so that it will open upon decreased engine pressure at higher engine speeds.

7. The reed valve of claim 6 wherein the second stage reed member includes a gap along a part of its length to increase its flexibility, and wherein the gap overlaps the web of the first stage reed member when the reed valve is in a closed position.

8. The reed valve of claim 6 wherein the second stage reed member includes a gap along a part of its length to increase its flexibility, and wherein the gap overlaps a portion of the first stage reed member when the reed valve is in a closed position.

9. The reed valve of claim 1 wherein
the first stage reed member includes a base end at which it is anchored to a reed cage; and
the web comprises an extension protruding from the base end of the first stage reed member.

10. In a multiple stage reed valve for controlling fluid intake into an internal combustion engine, said reed valve including a first stage valve member having a port therein to permit fluid flow therethrough and being sufficiently flexible to open under a decrease in pressure in the engine incident to higher speed engine operation but being sufficiently rigid to open minimally under the influence of decrease in pressure in the engine incident to lower speed engine operation, and a second stage valve member being adapted to cover the port in the first stage reed member and to restrict fluid flow through the reed valve during periods of no fluid intake into the engine, the second stage reed member being sufficiently flexible to uncover the port in the first stage reed member under the influence of decrease in pressure in the engine incident to engine operation at all engine speeds, the improvement which comprises:
the first stage reed member being constructed from a relatively thick, resilient material;
the port in the first stage reed member being dimensioned to overcome the resiliency of the material of the first stage reed member in order to provide sufficient flexibility of the first stage reed member; and
a web of material being provided within the port to assist in supporting the second stage reed member when the second stage reed member is closed against the first stage reed member, the web comprising an extension of the first stage reed member which protrudes into the port only in part.

11. The reed valve of claim 10 wherein the port of the first stage reed member is of a greater dimension in its width, perpendicular to the flow of fluid, than it is in its length.

12. The reed valve of claim 11 wherein the web partially bisects the width of the port of the first stage reed member, preventing the second stage reed member from passing through the port even under higher pressure in the engine.

13. The reed valve of claim 11 wherein the web partially bisects the width of the first stage reed member, preventing the second stage reed member from passing through the port even under higher pressure in the engine.

14. The reed valve of claim 13 wherein the web comprises an extension of the first stage reed member which protrudes in part into the port.

15. The reed valve of claim 14 wherein the second stage reed member includes a gap along a part of its length to increase its flexibility, and wherein the gap overlaps a portion of the first stage reed member when the reed valve is in a closed position.

16. The reed valve of claim 10 wherein the port and the second stage valve member are adapted to provide substantially even opening of the second stage valve member and substantially uniform flow across the width of the reed valve during operation.

17. The reed valve of claim 10 wherein multiple webs are provided within the port of the first stage reed member.

18. The reed valve of claim 17 wherein each web comprises an extension of the first stage reed member which protrudes in part into the port.

19. The reed valve of claim 18 wherein the second stage reed member includes a gap along its length, corresponding with a web in the first stage reed member, and wherein the gap overlaps one of the webs when the reed valve is in a closed position.

20. The reed valve of claim 10 wherein
the second stage reed member includes a port therein which overlaps the port in the first stage reed member when in a closed position, and
a third stage reed member is provided which is adapted to seal the port in the second stage reed member when the valve is in a closed position.

21. The reed valve of claim 20 wherein the second stage reed member is provided with a web of material within its port to assist in supporting the third stage reed member when the third stage reed member is closed against the second stage reed member.

22. The reed valve of claim 10 wherein
the first stage reed member includes a base end at which it is anchored to a reed cage; and
the web comprises an extension protruding from the base end of the first stage reed member.

23. A reed valve for controlling fluid flow into an internal combustion engine through a fluid intake, which comprises:
a first stage reed member and a second stage reed member;
the first stage reed member covering a valve seat oriented in a fluid intake of the engine and being sufficiently flexible to open the valve seat under the influence of decrease in pressure in the engine incident to higher speed engine operation but being sufficiently rigid to open minimally under the influence of decrease in pressure in the engine incident to lower speed engine operation, said first stage reed member having therein a port to permit fluid flow therethrough;
the second stage reed member being adapted to cover the port in the first stage reed member and to restrict fluid flow through the reed valves during periods of no fluid intake into the engine, the second stage reed member being sufficiently flexible to uncover the port in the first stage reed member under the influence of decrease in pressure in the engine incident to engine operation at all engine speeds;

wherein the port of the first stage reed member is of greater dimension in its width, perpendicular to the flow of fluid, than it is in its length; and wherein the first stage reed member includes a web protruding into the port only in part to assist in supporting the second stage reed member intermediate its ends during periods of no fluid intake into the engine, the web comprising an extension of the first stage reed member.

24. The reed valve of claim 23 wherein the first stage reed valve member includes multiple ports, each port having a web therein extending into the port only in part to assist in supporting the second stage reed valve member intermediate its ends during periods of no fluid flow into the engine.

25. The reed valve of claim 24 wherein the second stage reed valve member comprises a single member adapted to cover more than one port in the first stage reed valve member.

26. The reed valve of claim 25 wherein the second stage reed member includes a gap along a part of its length to increase its flexibility, and wherein the gap overlaps a portion of the first stage reed member when the reed valve is in a closed position.

27. The reed valve of claim 23 wherein the first stage reed member includes a base end at which it is anchored to a reed cage; and the web comprises an extension protruding from the base end of the first stage reed member.

* * * * *

UNITED STATES PATENT AND TRADEMARK OFFICE
CERTIFICATE OF CORRECTION

PATENT NO. : 5,176,170
DATED : Jan. 5, 1993
INVENTOR(S) : Eyvind Boyesen

It is certified that error appears in the above-identified patent and that said Letters Patent is hereby corrected as shown below:

Col. 5, line 57: "ember" should be --member--.

Signed and Sealed this

Twenty-sixth Day of October, 1993

Attest:

BRUCE LEHMAN

*Attesting Officer*  *Commissioner of Patents and Trademarks*